(12) United States Patent
Zhang et al.

(10) Patent No.: US 11,691,395 B2
(45) Date of Patent: Jul. 4, 2023

(54) COMPOSITE WITH DIRECT BONDING BETWEEN RUBBER AND FOAM

(71) Applicant: Dow Global Technologies LLC, Midland, MI (US)

(72) Inventors: Zheng Zhang, Shanghai (CN); Huaili Qin, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 445 days.

(21) Appl. No.: 16/624,227

(22) PCT Filed: Jun. 26, 2017

(86) PCT No.: PCT/CN2017/089956
§ 371 (c)(1),
(2) Date: Dec. 18, 2019

(87) PCT Pub. No.: WO2019/000155
PCT Pub. Date: Jan. 3, 2019

(65) Prior Publication Data
US 2021/0146661 A1    May 20, 2021

(51) Int. Cl.
*B32B 25/04*    (2006.01)
*B32B 5/20*    (2006.01)
(Continued)

(52) U.S. Cl.
CPC .............. *B32B 25/045* (2013.01); *B32B 5/20* (2013.01); *B32B 7/10* (2013.01); *B32B 25/12* (2013.01);
(Continued)

(58) Field of Classification Search
CPC ....... B32B 25/045; B32B 25/12; B32B 25/14; B32B 25/16; B32B 2266/0221;
(Continued)

(56) References Cited

U.S. PATENT DOCUMENTS 4,418,483 A   12/1983   Fujita et al.
6,528,550 B1   3/2003   Hsu et al.
(Continued)

FOREIGN PATENT DOCUMENTS

CN   202624104   12/2012
CN   205390515   7/2016
(Continued)

OTHER PUBLICATIONS

PCT/CN2017/089956, International Preliminary Report on Patentability dated Dec. 31, 2019.
(Continued)

*Primary Examiner* — Hai Vo

(57) ABSTRACT

This disclosure relates to a composite comprising (a) a rubber layer comprising a cured rubber and optionally a first copolymer having carboxyl groups or anhydride groups; and (b) a foam layer comprising a crosslinked ethylene vinyl acetate and optionally a second copolymer having carboxyl groups or glycidyl methacrylate groups; wherein the foam layer has at least one surface adhering to the rubber layer directly, and provided that either the first copolymer or the second copolymer is present, and the composite is free of glues or adhesive films in the interface between the rubber layer and the foam layer.

7 Claims, 1 Drawing Sheet

(51) Int. Cl.
  *B32B 7/10* (2006.01)
  *B32B 25/12* (2006.01)
  *B32B 25/14* (2006.01)
  *B32B 25/16* (2006.01)
  *C08L 23/08* (2006.01)

(52) U.S. Cl.
  CPC .............. *B32B 25/14* (2013.01); *B32B 25/16* (2013.01); *C08L 23/0853* (2013.01); *C08L 23/0884* (2013.01); *B32B 2266/0221* (2013.01); *B32B 2266/0242* (2013.01); *B32B 2270/00* (2013.01); *B32B 2305/72* (2013.01)

(58) Field of Classification Search
  CPC .............. B32B 2266/0242; B32B 7/10; C08L 23/0853; C08L 23/0884; C08J 9/0061; C08J 9/102; C08J 2400/26
  See application file for complete search history.

(56) References Cited

U.S. PATENT DOCUMENTS

| | | | |
|---|---|---|---|
| 2002/0120024 A1 | 8/2002 | Koffler et al. | |
| 2018/0319062 A1* | 11/2018 | Jindai | B29C 45/26 |
| 2019/0211199 A1* | 7/2019 | Zhang | A43B 13/04 |

FOREIGN PATENT DOCUMENTS

| | | |
|---|---|---|
| DE | 3031792 C2 | 5/1984 |
| WO | 2013134354 | 9/2013 |

OTHER PUBLICATIONS

PCT/CN2017/089956, International Search Report and Written Opinion dated Mar. 26, 2018.

* cited by examiner

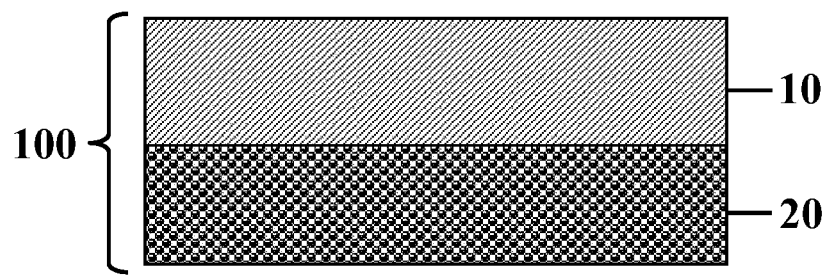

COMPOSITE WITH DIRECT BONDING BETWEEN RUBBER AND FOAM

TECHNICAL FIELD

The disclosure herein is related to a composite comprising a rubber layer and a foam layer, and articles made thereof.

BACKGROUND

Footwear typically includes a sole configured to be located under a wearer's foot to space the foot away from the ground or floor surface. The sole of footwear can be designed to provide a desired level of cushioning. A sole may be an assembly that includes a midsole and an outsole. Athletic footwear sometimes utilizes an ethylene vinyl acetate (EVA) foam layer as the midsole and a rubber layer as the outsole, and bonds these two layers together through at least one adhesive layer made of glues or adhesive film. Coating the glues to bonding the midsole and the outsole is a labor-intensive process, which include washing and drying the surfaces of midsole and outsole, coating primer, coating glues, removing chemical waste, etc. The complexity of the above coating process is a bottle neck in the sole making. Another approach for bonding the midsole and the outsole is laminating them together through adhesive film, i.e. EVA film. During the laminating process, it is very difficult to place the soft and tacky EVA film in the right position manually to perform an assembly. In addition, the adhesive film may squeeze out resulting in appearance issue, leading to low efficiency in mass production. The complexity and operation difficulties in the above processes are bottle necks in sole making. There is still a need to develop a technology to reduce the complexity and operation difficulties in the sole making process.

SUMMARY

Provided herein is a composite comprising:
(a) a rubber layer comprising a cured rubber and optionally a first copolymer having carboxyl groups or anhydride groups; and
(b) a foam layer comprising a crosslinked ethylene vinyl acetate and optionally a second copolymer having carboxyl groups or glycidyl methacrylate groups;
wherein the foam layer has at least one surface adhering to the rubber layer directly, and provided that either the first copolymer or the second copolymer is present, and the composite is free of glues or adhesive films in the interface between the rubber layer and the foam layer.

In one embodiment, the amount of the carboxyl groups in the first copolymer is about 0.05-1 weight %, the amount of the anhydride groups in the first copolymer is about 0.025-1 weight %, and the weight % is based on the total weight of the rubber layer.

In one embodiment, the amount of the carboxyl groups in the second copolymer is about 0.05-1 weight %, the amount of the glycidyl methacrylate groups in the second copolymer is about 0.15-3 weight %, and the weight % is based on the total weight of the foam layer.

In one embodiment, the first copolymer having carboxyl groups is selected from the group consisting of ethylene-maleic acid monoethyl ester copolymer, ethylene-acrylic acid copolymer, and ethylene-methacrylic acid copolymer, and mixtures thereof.

In one embodiment, the first copolymer having anhydride groups is selected from the group consisting of propylene-maleic anhydride copolymer, styrene-maleic anhydride copolymer, styrene-methyl methacrylate-maleic anhydride terpolymer, maleic anhydride grafted polyethylene, maleic anhydride grafted polypropylene, maleic anhydride grafted ethylene vinyl acetate copolymers, and maleic anhydride grafted ethylene-alkyl acrylate copolymers, and mixtures thereof.

In one embodiment, the second copolymer having carboxyl groups is selected from the group consisting of ethylene-maleic acid monoethyl ester copolymer, ethylene-acrylic acid copolymer, and ethylene-methacrylic acid copolymer, and mixtures thereof.

In one embodiment, the second copolymer having glycidyl methacrylate groups is selected from the group consisting of ethylene-glycidyl methacrylate copolymer, ethylene-vinyl acetate-glycidyl methacrylate copolymer, ethylene-butyl acrylate-glycidyl methacrylate copolymer, and mixtures thereof.

Further provided herein is an article comprising or produced from the composite described above.

In one embodiment, the article is used as a footwear sole, a carpet, a yoga mat, an acoustic panel, a cushion board.

Yet further provided herein is a method for preparing the composite described above, comprising:
(1) curing a mixture comprising a rubber, a curative and optionally a first copolymer having carboxyl groups or anhydride groups to obtain a rubber layer;
(2) foaming a mixture comprising an EVA, a crosslinking agent, a blowing agent, and optionally a second copolymer having carboxyl groups or glycidyl methacrylate groups to obtain a foam layer;
(3) placing the rubber layer on at least one surface of the foam layer to obtain an assembly, and hot pressing the assembly to obtain the composite.

In accordance with the present disclosure, when a range is given with two end points, it is understood that the range includes any value that is within the two end points and any value that is equal to or about equal to any of the two end points.

BRIEF DESCRIPTION OF THE DRAWINGS

FIG. 1 shows the side view of some embodiments of the present composite 100, comprising: a rubber layer 10 and a foam layer 20; wherein the foam layer 20 has at least one surface adhering to the rubber layer 10 directly, without any glue or adhesive film in the interface between the rubber layer 10 and the foam layer 20.

DETAILED DESCRIPTION

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of the disclosure, suitable methods and materials are described herein.

Unless stated otherwise, all percentages, parts, ratios, etc., are by weight. When an amount, concentration, or other value or parameter is given as either a range, preferred range or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the claimed invention. Where applicants have defined an invention or a portion thereof with an open-ended term such as "comprising," unless otherwise stated the description should be interpreted to also describe such an invention using the term "consisting essentially of".

Use of "a" or "an" are employed to describe elements and components of the invention. This is merely for convenience and to give a general sense of the invention. This description should be read to include one or at least one and the singular also includes the plural unless it is obvious that it is meant otherwise.

In describing certain polymers sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized comonomers.

The materials, methods, and examples herein are illustrative only and, except as specifically stated, are not intended to be limiting. Although methods and materials similar or equivalent to those described herein can be used in the practice or testing of the present disclosure, suitable methods and materials are described herein.

The disclosure is described in detail here below.

Copolymer

The copolymer used in the present invention is used to modify the cured rubber and/or the EVA foam, future to improve the bonding strength between the rubber layer and the foam layer, wherein the foam layer has at least one surface adhering to the rubber layer directly, and the composite is free of glues or adhesive films in the interface between the rubber layer and the foam layer.

In the present invention, the first copolymer having carboxyl groups or anhydride groups is used to modify the cured rubber in the rubber layer.

In one embodiment, the first copolymer has carboxyl groups, and is selected from the group consisting of ethylene-maleic acid monoethyl ester copolymer, ethylene-acrylic acid copolymer, and ethylene-methacrylic acid copolymer, and mixtures thereof.

In a further embodiment, the first copolymer is ethylene-maleic acid monoethyl ester copolymer.

The ethylene-maleic acid monoethyl ester copolymer used as the first copolymer is the copolymer comprising about 75-95 weight % of ethylene and about 5-25 weight % of maleic acid monoethyl ester, wherein weight % is based on the total weight of the first copolymer.

In one embodiment, the melting index (MI) of the first copolymer is in a range of about 5-400 g/10 min, or about 10-200 g/10 min, as measured at about 190° C. according to ASTM D1238.

In a further embodiment, the first copolymer is a copolymer comprising about 90 weight % of ethylene and about 10 weight % of maleic acid monoethyl ester, and having a MI of 25 g/10 min as measured at 190° C. according to ASTM D1238, wherein weight % is based on the total weight of the first copolymer.

In one embodiment, the amount of the carboxyl groups containing in the first copolymer is about 0.05-1 weight %, or about 0.1-0.2 weight %, and the weight % is based on the total weight of the rubber layer.

In one embodiment, the first copolymer has anhydride groups, and is selected from the group consisting of propylene-maleic anhydride copolymer, styrene-maleic anhydride copolymer, styrene-methyl methacrylate-maleic anhydride terpolymer, maleic anhydride grafted polyethylene, maleic anhydride grafted polypropylene, maleic anhydride grafted ethylene vinyl acetate copolymer, and maleic anhydride grafted ethylene-alkyl acrylate copolymer, and mixtures thereof.

In a further embodiment, the first copolymer is maleic anhydride grafted ethylene vinyl acetate copolymer.

In yet a further embodiment, the first copolymer is a copolymer comprising about 60-90 weight % of ethylene, about 9.9-37 weight % vinyl acetate and about 0.1-3 weight % of grafted maleic anhydride, wherein the weight % is based on the total weight of the first copolymer.

In one embodiment, the amount of the anhydride groups containing in the first copolymer is about 0.025-1 weight %, or about 0.1-0.2 weight %, and the weight % is based on the total weight of the rubber layer.

Methods for preparing the first copolymer are well known in the art. The first copolymer used in the present invention is commercially available, for example, NUCREL® or FUSABOND® from DuPont.

In the present invention, the second copolymer having carboxyl groups or glycidyl methacrylate groups is used to modify the crosslinked EVA in the foam layer.

In one embodiment, the second copolymer has carboxyl groups, and is selected from the group consisting of ethylene-maleic acid monoethyl ester copolymer, ethylene-acrylic acid copolymer, and ethylene-methacrylic acid copolymer, and mixtures thereof.

In a further embodiment, the second copolymer is ethylene-maleic acid monoethyl ester copolymer.

The ethylene-maleic acid monoethyl ester copolymer used as the second copolymer is ae copolymer comprising about 75-95 weight % of ethylene and about 5-25 weight % of maleic acid monoethyl ester, wherein weight % is based on the total weight of the first copolymer.

In one embodiment, the MI of the second copolymer is in a range of about 5-400 g/10 min, or about 10-200 g/10 min, as measured at about 190° C. according to ASTM D1238.

In a further embodiment, the second copolymer is a copolymer comprising about 90 weight % of ethylene and about 10 weight % of maleic acid monoethyl ester, and having a MI of about 25 g/10 min as measured at about 190° C. according to ASTM D1238, wherein weight % is based on the total weight of the second copolymer.

In one embodiment, the amount of the carboxyl groups containing in the second copolymer is about 0.05-1 weight %, or about 0.1-0.2 weight %, and the weight % is based on the total weight of the foam layer.

In one embodiment, the second copolymer has glycidyl methacrylate groups, and is selected from the group consisting of ethylene-glycidyl methacrylate copolymer, ethylene-vinyl acetate-glycidyl methacrylate copolymer, ethylene-butyl acrylate-glycidyl methacrylate copolymer, and mixtures thereof.

In a further embodiment, the second copolymer is ethylene-vinyl acetate-glycidyl methacrylate copolymer.

In yet a further embodiment, the second copolymer is a copolymer comprising about of 65-94 weight % of ethylene, about 5-20 weight % of vinyl acetate, and about 1-15 weight % of glycidyl methacrylate, wherein the weight % is based on the total weight of the second copolymer.

In one embodiment, the second copolymer has a MI of about 1-25 g/10 min as measured at about 190° C. according to ASTM D1238.

In one embodiment, the amount of the glycidyl methacrylate groups containing in the second copolymer is about 0.15-3 weight %, or about 0.2-0.5 weight %, and the weight % is based on the total weight of the foam layer.

Methods for preparing the second copolymer are well known in the art. The second copolymer used in the present invention are commercially available, for example, NUCREL®, FUSABOND®, or ELVALOY® from DuPont.

Rubber Layer

The rubber layer in the present invention comprises a cured rubber, or comprises a cured rubber and a first copolymer having carboxyl groups or anhydride groups.

The cured rubber in the present invention is the product for curing natural rubber or synthetic rubber into more durable materials by the addition of curatives, forming crosslinks between individual polymer chains. The term "curing" used herein means toughening or hardening of a rubber by crosslinking of polymer chains. In rubber, the curing process is also called vulcanization.

Example of natural rubber used in the present invention is the rubber based on polyisoprene. Example of synthetic rubber used in this invention includes, without limitation, polybutadiene rubber, acrylonitrile butadiene rubber, styrene butadiene rubber, styrene acrylonitrile butadiene rubber, polychloroprene rubber, isoprene-isobutylene copolymer rubber, ethylene propylene-diene copolymer rubber, butadiene ethylene copolymer rubber, butadiene isoprene copolymer rubber, polypentenamer rubber, styrene-butadiene-styrene block copolymer rubber, and mixtures thereof.

In one embodiment, the rubber used in the present invention is selected from the group consisting of polybutadiene rubber, acrylonitrile butadiene rubber, polyisoprene rubber, and mixtures thereof.

In a further embodiment, the rubber used in the present invention comprises about 50-90 weight % of polybutadiene rubber, about 5-25 weight % of acrylonitrile butadiene rubber, and about 5-25 weight % of polyisoprene rubber, wherein the weight % is based on the total weight of rubber.

In yet a further embodiment, the rubber used in the present invention comprises about 50-90 weight % of polybutadiene rubber and about 10-50 weight % of acrylonitrile butadiene rubber, wherein the weight % is based on the total weight of rubber.

In yet a further embodiment, the rubber used in the present invention comprises about 50-90 weight % of natural rubber and about 10-50 weight % of styrene butadiene rubber, wherein the weight % is based on the total weight of rubber.

The rubber layer in the present invention is derived from the reaction of a rubber, a curative, optionally a first copolymer having carboxyl groups or anhydride groups and optionally other additives.

Curatives used in the present invention are commonly used curing agents such as sulfur, organic sulfide, disulfide or polysulfide compounds. Example of curatives used in this invention includes, without limitation, morpholine disulfide, 2-(4'-morphol inodithio) benzothiazole, tetramethylthriuram disulfide, tertraethylthiuram disulfide, dipentamethylenethiuram tertrasulfide, and mixtures thereof.

In one embodiment, the curative used in the present invention is sulphur.

Other additives used in the rubber layer are commonly used and well known in the art. Example of other additives used in the rubber layer includes, without limitation, activators, fillers, processing aids, accelerators, colorants including dyes and pigments, anti-UV agents, and anti-oxidation agents.

Activators used in the rubber layer are to activate the curing reaction. Example of activators used in this invention includes, without limitation, zinc oxide and stearic acid.

Fillers used in the rubber layer are to regulate mechanical properties of the rubber. Example of activators used in this invention includes, without limitation, silica, carbon black, calcium carbonate and talc.

Processing aids used in the rubber layer are to adjust the viscosity of the melting materials. Example of processing aids used in this invention includes, without limitation, oil, wax, and polyethylene glycol.

Accelerators used in the rubber layer are to enhance the curing speed of the rubber. Example of accelerators used in this invention includes, without limitation, 2,2'-dibenzothiazoledisulfde and tetrakis(phenylmethyl)thioperoxydi(carbothioamide).

Methods for curing the rubber are well known in the art. For example, mixing a rubber, a curative, other additives, and optionally a first copolymer having carboxyl groups or anhydride groups, to obtain a mixture, heating the mixture in a mold at a temperature of about 100-170° C. and a pressure of about 1-20 MPa, forming crosslinks between individual polymer chains, to obtain a cured rubber or a rubber layer comprising a cured rubber and a first copolymer having carboxyl groups or anhydride groups.

Foam Layer

The foam layer in the present invention comprises a crosslinked EVA, or comprise a crosslinked EVA and a second copolymer having carboxyl groups or glycidyl methacrylate groups.

The crosslinked EVA used in the present invention is the copolymer of ethylene and vinyl acetate, with crosslinks between individual polymer chains.

In one embodiment, the amount of vinyl acetate is about 10-49 weight %, or about 20-45 weight %, and the weight % is based on the total weight of the crosslinked ethylene vinyl acetate.

The foam layer in the present invention is produced by foaming EVA to form the closed cells and crosslinks between individual polymer chains in EVA. The expansion ratio of the foamed EVA is in a range of about 150%-200%, wherein the expansion ratio used herein is defined as the ratio of the side length of the final foam to the side length of the mold which is full of raw materials for foaming. The density of the foamed EVA is in a range of about 0.1-0.4 g/cm$^3$.

The foam layer in the present invention is derived from the reaction of a EVA, a crosslinking agent, a blowing agent, and optionally a second copolymer having carboxyl groups or glycidyl methacrylate groups and optionally other additives.

Example of crosslinking agent used in the foam layer includes, without limitation, dicumyl peroxide, 1,3-bis(tert-butylperoxy-isopropyl)benzene, 1,1-Bis(tert-butyl peroxy)-3,3,5-tri methylcyclohexane, 2,5-dimethyl-2,5-di(tert-butyl peroxy)hexane, 2,4-dichlorobenzoyl peroxide, tert-butyl peroxybenzoate, and benzoyl peroxide.

Example of blowing agent used in the foam layer includes, without limitation, azobisformamide, p-toluenesulfonylhydrazide, p,p'-oxybis benzene sulfonylthdrazide.

Other additives used in the foam layer are commonly used and well known in the art. Example of other additives used in the foam layer includes, without limitation, activators, fillers, processing aids, accelerators, colorants including dyes and pigments, anti-UV agents, and anti-oxidation agents.

Example of activators used in this invention includes, without limitation, zinc oxide and stearic acid.

Fillers used in the foam layer are to regulate the mechanical properties or the color of the foam layer. Example of fillers used in this invention includes, without limitation, silica, carbon black, titanium dioxide, calcium carbonate and talc.

Methods for foaming the EVA to obtain the foam layer are well known in the art. For example, mixing a EVA, a crosslinking agent, a blowing agent, other additives, and optionally a second copolymer having carboxyl groups or anhydride groups to obtain a mixture, heating the mixture in a mold at a temperature of about 160-180° C. to form closed cells and crosslinks between individual polymer chains, and to obtain a foam layer comprising a crosslinked EVA, or a foam layer comprise a crosslinked EVA and a second copolymer having carboxyl groups or glycidyl methacrylate groups.

Method of Preparing the Composite

Further disclosed herein are methods for preparing the composite described above.

The composite described above may be prepared as follow:

(1) curing a mixture comprising a rubber, a curative, and optionally a first copolymer having carboxyl groups or anhydride groups to obtain a rubber layer;

(2) foaming a mixture comprising an EVA, a crosslinking agent, a blowing agent, and optionally a second copolymer having carboxyl groups or glycidyl methacrylate groups to obtain a foam layer;

(3) placing the rubber layer on at least one surface of the foam layer to obtain an assembly, and hot pressing the assembly to obtain the composite.

In step (3) of the process, hot pressing is produced at the temperature of about 120-180° C. or about 150-170° C. and with the pressure of 1-10 MPa.

In step (1) of the process, the curing degree of the obtained cured rubber is regulated to about 50-100% by adjusting curing time and temperature. The term "curing degree" or "degree of curing" is to be understood as degree of crosslinking reaction, and is measured on moving die rheometer (MDR) according to ASTM D5289, in which curing degree is defined as the proportion of torque value at a certain time over the maximum torque value when crosslinking reaction completed, with unit of "%". In step (3) of the process, the cured rubber having curing degree of lower than 100% was further cured to be 100% of curing degree after hot pressing.

Article

Further disclosed herein is an article comprising or produced from the composite described above. The article is used as a footwear sole, a carpet, a yoga mat, an acoustic panel, a cushion board.

In one embodiment, the article is a footwear sole produced from the composite described above, wherein a footwear sole including a middle sole and an outer sole, the rubber layer is used as the outsole, and the foam layer is used as the middle sole.

The rubber layer and the foam layer of the composite in present invention can be any shape and any size, depending on the mold for the article made thereof. For example, the rubber layer has a shape of the outsole in footwear sole, and the foam layer has a shape of middle sole in footwear sole. In one embodiment, the rubber layer and the foam layer each independently has a thickness of about 0.1-100 mm or about 0.5-50 mm.

The composite disclosed herein possess good bonding strength, although having no conventional glues or adhesive films. The bonding strength of the present composite is evaluated by the peel strength between the rubber layer and the foam layer. If a greater strength is needed to peel the rubber layer and the foam layer apart which means that the bonding strength between these layers is higher. As used herein, the term "peel strength" refers to the maximum strength by peeling off the rubber layer from the foam layer.

Articles comprise, consist essentially of, consist of, or are produced from the composite in the present invention composite have high structural integrity due to their excellent interlayer bonding strength. Furthermore, the composite in the present invention is not only free of glues or adhesive films in the interface between the rubber layer and the foam layer, but also reduce the complexity and difficulties in the sole making process and improve the process efficiency, which is possible to involve machines for automation production.

Articles in the present invention are useful as a footwear sole, a carpet, a yoga mat, an acoustic panel, or a cushion board, which preferably have a peel strength of more than 0.9 N/mm, or 1.2 N/mm, or 1.5 N/mm or more.

Without further elaboration, it is believed that one skilled in the art using the preceding description can utilize the present invention to its fullest extent. The following examples are, therefore, to be construed as merely illustrative, and not limiting of the disclosure in any way whatsoever.

EXAMPLES

The abbreviation "E" stands for "Example" and "CE" stands for "Comparative Example" is followed by a number indicating in which example the composite is prepared. The examples and comparative examples were all prepared and tested in a similar manner. The abbreviation of "pbw" stands for "parts by weight".

Materials:
Rubber: a mixture of nitrile butadiene rubber (25 pbw, obtained from Petro China CO. Ltd.) and butadiene rubber (75 pbw, obtained from Sinopec Co. Ltd.);

Activator-1: a mixture of zinc oxide (3.5 pbw, powder, purity >99%, obtained from Sino Reagent Co., Ltd.) and stearic acid (1 pbw, pellets purity >99%, obtained from Sino Reagent Co. Ltd.);

Filler-1: silica, powder, obtained from Degussa with tradename of Ultrasil® VN3;

Processing aid: a mixture of soybean oil (3 pbw, obtained from Aladdin reagent), wax (0.5 pbw, obtained from Aladdin reagent) and polyethylene glycol (2.5 pbw molecular weight: 4000, obtained from Sino Reagent Co. Ltd.);

Accelerator: a mixture of 2,2'-dibenzothiazoledisulfde (0.6 pbw, CAS No.: 120-78-5, obtained from Willing Chem. Co.) and tetrakis(phenylmethyl)thioperoxydi (carbothioamide) (0.2 pbw, CAS No.: 10591-85-2, obtained from Willing Chem. Co.);

Curative: sulphur, powder, purity >99%, obtained from Sino Reagent Co. Ltd;

EVA: a copolymer comprising 75 weight % of ethylene and 25 weight % of vinyl acetate, based on the total weight of EVA, with a MI of 3 g/10 min as measured at 190° C. according to ASTM D1238, obtained from DuPont;

Activator-2: a mixture of zinc oxides (1 pbw, powder, purity >99%, obtained from Sino Reagent Co., Ltd.) and stearic acid (0.5 pbw, pellets purity >99%, obtained from Sino Reagent Co. Ltd.);

Filler-2: a mixture of titanium dioxide (2.5 pbw, obtained from Chemours) and talc (5 pbw, obtained from Haicheng (China), Co. Ltd.);

Blowing agent: azobisformamide, obtained from Haihong (China) Co. Ltd.;

Crosslinking agent: 1,3-bis(tert-butylperoxy-isopropyl) benzene, obtained from Haili (China) Co. Ltd.;

First copolymer: a copolymer comprising 90 weight % of ethylene and 10 weight % of maleic acid monoethyl ester, based on the total weight of the first copolymer, with a MI of 25 g/10 min as measured at 190° C. according to ASTM D1238, obtained from DuPont;

Second copolymer-1: a copolymer ocomprising 90 weight % of ethylene and 10 weight % of maleic acid monoethyl ester, based on the total weight of the first copolymer, with a MI of 25 g/10 min as measured at 190° C. according to ASTM D1238, obtained from DuPont;

Second copolymer-2: a copolymer comprising 76 weight % of ethylene, 15 weight % of vinyl acetate and 9 weight % of glycidyl methacrylate, with a MI of 8 g/10 min as measured at 190° C. according to ASTM D1238, obtained from DuPont.

Comparative Example CE1 and Example E1-E11

In each of CE1 and E1-E11, the composite was prepared as follow:

$1^{st}$ Step: Preparing Rubber Layer

Rubber, filler-1, activator-1, processing aid, and optionally the first copolymer were mixed at 130° C. in the mixer machine (Brabender) to obtain a mixture, then curative, accelerator and the mixture were added into a two-roll mill (manufactured by Wei Fu Hsing Machinery) for calendaring to obtain a rubber slab having a thickness of about 2.5 mm. The rubber slab was placed in a mold (size: 140 mm×140 mm×2 mm) for curing to obtain a rubber layer having a thickness of about 2 mm. Composition of each rubber layer (R1-R4) is shown in Table 1. The abbreviation "R" stands for "Rubber layer" is followed by a number indicating in which composition the rubber layer is prepared.

Also listed in table 1 is the amount of carboxyl groups in each rubber layer, which is calculated by the amount of the first copolymer in each composition. For example, in the composition of R2, the amount of the first copolymer is 2.5/156×100%=1.6 weight %, the amount of carboxyl group in the first copolymer is 10 weight % (content of maleic acid monoethyl ester in the first copolymer)×45 (molecular weight of carboxyl)/144 (molecular weight of maleic acid monoethyl ester)=3.1 weight %, as a result, the amount of the carboxyl group is 1.6 weight %×3.1 weight %=0.05 weight %, based on the total weight of the rubber layer.

$2^{nd}$ Step: Preparing Foam Layer

The raw materials used for each foam layer (as listed in Table 2) were compounded to obtain an EVA compound, then the EVA compound was kept in the closed mold (size:185 mm×120 mm×10 mm) of a phylon machine (King Steel shoe making machine, Model No.: KS-C901ULY1) at about 175° C. for about 460 sec, then the mold was opened and cooled at about 30-60° C. for about 30 min to obtain a foam layer having a thickness of about 12 mm and an expansion ratio of about 150%-160%. Composition of each foam layer (F1-F3) is shown in Table 2. The abbreviation "F" stands for "Foam layer" is followed by a number indicating in which composition the foam layer is prepared. The amount of carboxyl groups or glycidyl methacrylate groups in each foam layer was also listed in Table 2.

$3^{rd}$ Step: Hot Pressing:

Each rubber layer and foam layer was cleaned by using ethanol and water, and then dried at room temperature. A metal frame mold (size: 200 mm×200 mm×6 mm) was applied for hot pressing. A release paper was placed in the bottom of the mold to facilitate eventual removal of the prepared composite from the mold after hot pressing, the foam layer and the rubber layer was placed on the release paper successively to perform an assembly, and a second release paper was placed on top of the assembly, then the mold was closed and hot pressed for about 6 minutes at about 160° C. with a pressure of about 10 MPa in a hot pressing machine. After hot pressing, the mold was taken out of the hot pressing machine; and the composite was removed from the mold and cooled to ambient temperature. The structures of the composite in the examples and comparative example are shown in Table 3. As used herein to describe the structure of a composite, the "I" is used to separate each distinctive layer with the adjacent layer(s) therein. Therefore, the structure of the present composite may be represented as "R/F".

Peel Strength Measurement

Each sample was cut to obtain 3 test specimens (i.e. a rectangle of 100.0 mm×25.4 mm). Each test specimen was fixed on a sample holder of an Instron® materials test machine (manufactured by Instron® company, model No.: 5567). The 180° peel strength was measured with a crosshead speed of 12 inch/min and a load of 1 kN. The average value of the peel strength of the 3 test specimens was recorded as peel strength in unit of N/mm, and listed in Tables 3.

TABLE 1

|  | R1 | R2 | R3 | R4 |
|---|---|---|---|---|
| Rubber (pbw) | 100 | 100 | 100 | 100 |
| Activator-1 (pbw) | 4.5 | 4.5 | 4.5 | 4.5 |
| Filler-1 (pbw) | 40 | 40 | 40 | 40 |

TABLE 1-continued

|  | R1 | R2 | R3 | R4 |
|---|---|---|---|---|
| Processing aid (pbw) | 6 | 6 | 6 | 6 |
| Accelerator (pbw) | 0.8 | 0.8 | 0.8 | 0.8 |
| Curative (pbw) | 2.2 | 2.2 | 2.2 | 2.2 |
| First copolymer (pbw) | 0 | 2.5 | 5 | 10 |
| Total (pbw) | 153.5 | 156 | 158.5 | 163.5 |
| Calculated amount of carboxyl groups in rubber layer (weight %) | 0 | 0.05 | 0.1 | 0.19 |

TABLE 2

|  | F1 | F2 | F3 |
|---|---|---|---|
| EVA (pbw) | 100 | 94 | 94 |
| Activator-2 (pbw) | 1.5 | 1.5 | 1.5 |
| Filler-2 (pbw) | 7.5 | 7.5 | 7.5 |
| Blowing agent (pbw) | 2.8 | 2.8 | 2.8 |
| Crosslinking agent (pbw) | 0.8 | 0.8 | 0.8 |
| Second copolymer-1 (pbw) | 0 | 6 | 0 |
| Second copolymer-2 (pbw) | 0 | 0 | 6 |
| Total (pbw) | 112.6 | 112.6 | 112.6 |
| Calculated amount of carboxyl groups in foam layer (weight %) |  | 0.17 |  |
| Calculated amount of glycidyl methacrylate groups in foam layer (weight %) |  |  | 0.48 |

TABLE 3

|  | R1 | R2 | R3 | R4 |
|---|---|---|---|---|
| Amount of carboxyl groups | 0 | 0.05 weight % | 0.1 weight % | 0.19 weight % |
| F1 (without carboxyl groups) | CE1(R1/F1*) 0.85 N/mm | E1(R2/F1*) 1.22 N/mm | E2(R3/F1*) 1.60 N/mm | E3(R3/F1*) 1.77 N/mm |
| F2 (amount of carboxyl groups: 0.17 weight %) | E4(R1/F2*) 0.98 N/mm | E5(R2/F2*) 2.17 N/mm | E6(R3/F2*) 1.51 N/mm | E7(R4/F2*) 1.75 N/mm |
| F3 (amount of glycidyl methacrylate groups: 0.48 weight %) | E8(R1/F3*) 1.34 N/mm | E9(R2/F3*) 1.98 N/mm | E10(R3/F3*) 1.73 N/mm | E11(R4/F3*) 2.56 N/mm |

*the "/" is used to separate each distinctive layer with the adjacent layer(s).

From the results of Table 3, the following descriptions are evident.

Comparing between E1-E3 and CE1, that have same foam layer having no carboxyl groups and rubber layer with various amount of carboxyl groups, the composite of E1-E3 provides surprising improvement in peel strength than that of the composite of CE1.

In one embodiment, the composite in the present invention comprises:

(a) a rubber layer comprising a cured rubber and a first copolymer having carboxyl groups; and (b) a foam layer comprising a crosslinked ethylene vinyl acetate; wherein the foam layer has at least one surface adhering to the rubber layer directly, and the composite is free of glues or adhesive films in the interface between the rubber layer and the foam layer.

Comparing between E4-E7 and CE1, the composite of E4-E7 provides surprising improvement in peel strength than that of the composite of CE1. The excellent peel strength data of the composite laminate of E4-E7 may attributed to the incorporation of carboxyl groups in the foam layer. Comparing between E5-E7 and E4, the composite of E5-E7 provides surprising improvement in peel strength than the composite of E4. The further improvement in peel strength data of the composite laminate of E5-E7 may attributed to the incorporation of carboxyl groups in both the rubber layer and the foam layer.

In one embodiment, the composite in the present invention comprises:

(a) a rubber layer comprising a cured rubber; and (b) a foam layer comprising a crosslinked ethylene vinyl acetate and a second copolymer having carboxyl groups;

wherein the foam layer has at least one surface adhering to the rubber layer directly, and the composite is free of glues or adhesive films in the interface between the rubber layer and the foam layer.

In another embodiment, the composite in the present invention comprises:

(a) a rubber layer comprising a cured rubber and a first copolymer having carboxyl groups; and (b) a foam layer comprising a crosslinked ethylene vinyl acetate and a second copolymer having carboxyl groups;

wherein the foam layer has at least one surface adhering to the rubber layer directly, and the composite is free of glues or adhesive films in the interface between the rubber layer and the foam layer.

Comparing between E8-E11 and CE1, the composite of E8-E11 provides surprising improvement in peel strength than that the composite of CE1. The excellent peel strength data of the composite laminate of E8-E11 may attributed to the incorporation of glycidyl methacrylate groups in the foam layer.

In one embodiment, the composite in the present invention comprises:

(a) a rubber layer comprising a cured rubber; and (b) a foam layer comprising a crosslinked ethylene vinyl acetate and optionally a second copolymer having glycidyl methacrylate groups;

wherein the foam layer has at least one surface adhering to the rubber layer directly, and the composite is free of glues or adhesive films in the interface between the rubber layer and the foam layer.

In another embodiment, the composite in the present invention comprises:

(a) a rubber layer comprising a cured rubber and a first copolymer having carboxyl groups; and (b) a foam layer comprising a crosslinked ethylene vinyl acetate and optionally a second copolymer having glycidyl methacrylate groups; wherein the foam layer has at least one surface adhering to the rubber layer directly, and the composite is free of glues or adhesive films in the interface between the rubber layer and the foam layer.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art.

What is claimed is:

1. A composite comprising the following components:
   (a) a rubber layer comprising a cured rubber that is formed from a composition comprising the rubber and a first copolymer having carboxyl groups wherein the carboxyl groups in the first copolymer are present in an amount of about 0.05 to about 1 weight % based on the total weight of the rubber layer, and wherein the first copolymer having carboxyl groups is a copolymer selected from the group consisting of ethylene-maleic acid monoethyl ester copolymer, ethylene-acrylic acid copolymer, ethylene-methacrylic acid copolymer, and mixtures thereof; and
   (b) a foam layer comprising a crosslinked ethylene vinyl acetate that is formed from a composition comprising the ethylene vinyl acetate and a second copolymer having glycidyl methacrylate groups, wherein the glycidyl methacrylate groups in the second copolymer are present in an amount of about 0.15 to about 3 weight % based on the total weight of the foam layer, wherein the second copolymer having glycidyl methacrylate groups is a copolymer selected from the group consisting of ethylene-glycidyl methacrylate copolymer, ethylene-vinyl acetate- glycidyl methacrylate copolymer, ethylene-butyl acrylate-glycidyl methacrylate copolymer, and mixtures thereof, and wherein the foam layer is free of the first copolymer having the carboxyl groups;
   wherein the foam layer has at least one surface adhering to the rubber layer directly, and
   wherein the composite is free of glues or adhesive films in the interface between the rubber layer and the foam layer.

2. An article comprising or produced from the composite according to claim 1.

3. The article according to claim 2, wherein the article has a peel strength greater than 1.2 N/mm.

4. The article according to claim 2, wherein the article has a peel strength greater than 1.5 N/mm.

5. The article according to claim 2, wherein the article has a peel strength greater than 1.7 N/mm.

6. The article according to claim 2, which is used as a footwear sole, a carpet, a yoga mat, an acoustic panel, or a cushion board.

7. A method for preparing the composite according to claim 1, comprising:
   (1) curing a mixture comprising a rubber, a curative, and a first copolymer having carboxyl groups to obtain a rubber layer, wherein the carboxyl groups in the first copolymer are present in an amount of about 0.05 to about 1 weight % based on the total weight of the rubber layer, and wherein the first copolymer having the carboxyl groups is a copolymer selected from the group consisting of ethylene-maleic acid monoethyl ester copolymer, ethylene-acrylic acid copolymer, ethylene-methacrylic acid copolymer, and mixtures thereof;
   (2) foaming a mixture comprising an ethylene vinyl acetate, a crosslinking agent, a blowing agent, and a second copolymer having glycidyl methacrylate groups to obtain a foam layer, wherein the glycidyl methacrylate groups in the second copolymer are present in an amount of about 0.15 to about 3 weight % based on the total weight of the foam layer, wherein the second copolymer having the glycidyl methacrylate groups is a copolymer selected from the group consisting of ethylene-glycidyl methacrylate copolymer, ethylene-vinyl acetate-glycidyl methacrylate copolymer, ethylene-butyl acrylate-glycidyl methacrylate copolymer, and mixtures thereof, and wherein the foam layer is free of the first copolymer having the carboxyl groups; and
   (3) placing the rubber layer on at least one surface of the foam layer to obtain an assembly, and hot pressing the assembly to obtain the composite, and wherein the composite is free of glues or adhesive films in the interface between the rubber layer and the foam layer.

* * * * *

UNITED STATES PATENT AND TRADEMARK OFFICE
CERTIFICATE OF CORRECTION

Page 1 of 2

PATENT NO. : 11,691,395 B2
APPLICATION NO. : 16/624227
DATED : July 4, 2023
INVENTOR(S) : Zheng Zhang and Huaili Qin It is certified that error appears in the above-identified patent and that said Letters Patent is hereby corrected as shown below:

In the Claims

Claim 1 should read: "A composite comprising the following components: (a) a rubber layer comprising a cured rubber that is formed from a composition comprising the rubber and optionally a first copolymer having carboxyl groups or anhydride groups; and (b) a foam layer comprising a crosslinked ethylene vinyl acetate that is formed from a composition comprising the ethylene vinyl acetate and optionally a second copolymer having carboxyl groups or glycidyl methacrylate groups; wherein the foam layer has at least one surface adhering to the rubber layer directly, and wherein the composite further comprises: a first copolymer having carboxyl groups or anhydride groups present in the rubber layer; a second copolymer having carboxyl groups or glycidyl methacrylate groups present in the foam layer; or both; and the composite is free of glues or adhesive films in the interface between the rubber layer and the foam layer."

Claim 2 should read: "The composite according to claim 1, wherein when the first copolymer is present, the amount of the carboxyl groups in the first copolymer is about 0.05- 1 weight%, or the amount of the anhydride groups in the first copolymer is about 0.025-1 weight%, and each the weight% is based on the total weight of the rubber layer."

Claim 3 should read: "The composite according to claim 1, wherein when the second copolymer is present, the amount of the carboxyl groups in the second copolymer is about 0.05-1 weight%, or the amount of the glycidyl methacrylate groups in the second copolymer is about 0.15-3 weight%, and each the weight% is based on the total weight of the foam layer."

Claim 4 should read: "The composite according to claim 1, wherein when the first copolymer is present, the first copolymer has carboxyl groups selected from the group consisting of ethylene-maleic acid monoethyl ester copolymer, ethylene-acrylic acid copolymer, ethylene-methacrylic acid copolymer, and mixtures thereof."

Claim 5 should read: "The composite according to claims 1, wherein when the first copolymer is present, the first copolymer has anhydride groups selected from the group consisting of propylene- Signed and Sealed this
Thirty-first Day of December, 2024

Derrick Brent
*Acting Director of the United States Patent and Trademark Office*

CERTIFICATE OF CORRECTION (continued)
U.S. Pat. No. 11,691,395 B2 maleic anhydride copolymer, styrene-maleic anhydride copolymer, styrene-methyl methacrylate-maleic anhydride terpolymer, maleic anhydride grafted polyethylene, maleic anhydride grafted polypropylene, maleic anhydride grafted ethylene vinyl acetate copolymers, maleic anhydride grafted ethylene-alkyl acrylate copolymers, and mixtures thereof."

Claim 6 should read: "The composite according to claim 1, wherein when the second copolymer is present, the second copolymer has carboxyl groups selected from the group consisting of ethylene-maleic acid monoethyl ester copolymer, ethylene-acrylic acid copolymer, ethylene-methacrylic acid copolymer, and mixtures thereof."

Claim 7 should read: "The composite according to claim 1, wherein when the second copolymer is present, the second copolymer has glycidyl methacrylate groups selected from the group consisting of ethylene-glycidyl methacrylate copolymer, ethylene-vinyl acetate glycidyl methacrylate copolymer, ethylene-butyl acrylate-glycidyl methacrylate copolymer, and mixtures thereof."

Claim 8 should read: "An article comprising or produced from the composite according to claim 1."

Claim 9 should read: "The article according to claim 8, which is used as a footwear sole, a carpet, a yoga mat, an acoustic panel, or a cushion board."

Claim 10 should read: "The composite according to claim 1, wherein the second copolymer has glycidyl methacrylate groups."

Claim 12 should read: "The composite according to claim 1, wherein the first copolymer has carboxyl groups."

Claim 13 should read: "The composite according to claim 11, wherein the first copolymer has carboxyl groups."

Claim 15 should read: "An article comprising or produced from the composite according to claim 11."

Claim 16 should read: "An article comprising or produced from the composite according to claim 14."

Claim 17 should read: "The article according to claim 8, wherein the article has a peel strength greater than 1.2 N/mm."

Claim 18 should read: "The article according to claim 8, wherein the article has a peel strength greater than 1.5 N/mm."

Claim 19 should read: "The article according to claim 8, wherein the article has a peel strength greater than 1.7 N/mm."